United States Patent
Lee et al.

(10) Patent No.: US 10,105,654 B2
(45) Date of Patent: Oct. 23, 2018

(54) FILTERING SYSTEM AND HOLLOW FIBER MEMBRANE MODULE FOR THE SAME

(71) Applicant: KOLON INDUSTRIES, INC., Gwacheon-si, Gyeonggi-do (KR)

(72) Inventors: Ah Reum Lee, Yongin-si (KR); Heewan Moon, Yongin-si (KR); Jung Min Noh, Seongnam-si (KR); Won Byung Park, Seoul (KR); Young Kyu Kim, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 0 days.

(21) Appl. No.: 15/315,001

(22) PCT Filed: May 29, 2015

(86) PCT No.: PCT/KR2015/005374
§ 371 (c)(1),
(2) Date: Nov. 30, 2016

(87) PCT Pub. No.: WO2015/183022
PCT Pub. Date: Dec. 3, 2015

(65) Prior Publication Data
US 2017/0197183 A1    Jul. 13, 2017

(30) Foreign Application Priority Data

May 30, 2014   (KR) .................. 10-2014-0066296
Jul. 16, 2014   (KR) .................. 10-2014-0089714

(51) Int. Cl.
*B01D 63/02*   (2006.01)
*B01D 69/08*   (2006.01)
(Continued)

(52) U.S. Cl.
CPC ............. *B01D 63/02* (2013.01); *B01D 69/08* (2013.01); *C02F 1/44* (2013.01); *C02F 1/52* (2013.01);
(Continued)

(58) Field of Classification Search
CPC .... B01D 2311/04; B01D 63/02; B01D 69/08; C02F 1/44; C02F 1/52; C02F 2001/007
See application file for complete search history.

(56) References Cited

U.S. PATENT DOCUMENTS

2001/0037964 A1*  11/2001  Won ...................... B01D 61/18
                                                              210/120
2002/0011438 A1    1/2002  Jimbo et al.
(Continued)

FOREIGN PATENT DOCUMENTS

| | | |
|---|---|---|
| JP | 5-168871 A | 7/1993 |
| JP | 3008945 B1 | 2/2000 |

(Continued)

OTHER PUBLICATIONS

International Searching Authority, International Search Report for PCT/KR2015/005374 dated Aug. 27, 2015 [PCT/ISA/210].
(Continued)

*Primary Examiner* — John Kim
(74) *Attorney, Agent, or Firm* — Sughrue Mion, PLLC

(57) ABSTRACT

An energy-saving filtering system and a hollow fiber membrane module for the same are disclosed. According to the filtering system of the present invention, pretreated feed water flows into the case of the hollow fiber membrane module by gravity, and the filtrate passing through the hollow fiber membrane is discharged from the hollow fiber membrane module by gravity.

18 Claims, 9 Drawing Sheets

(51) Int. Cl.
*C02F 1/44* (2006.01)
*C02F 1/00* (2006.01)
*C02F 1/52* (2006.01)

(52) U.S. Cl.
CPC .... *B01D 2311/04* (2013.01); *C02F 2001/007* (2013.01)

(56) References Cited

U.S. PATENT DOCUMENTS

| | | |
|---|---|---|
| 2006/0273007 A1 | 12/2006 | Zha et al. |
| 2014/0042074 A1 | 2/2014 | Noh et al. |

FOREIGN PATENT DOCUMENTS

| | | |
|---|---|---|
| JP | 2003-053154 A | 2/2003 |
| JP | 2005-34715 A | 2/2005 |
| KR | 10-2001-0069057 A | 7/2001 |
| KR | 10-2012-0122381 A | 11/2012 |
| KR | 10-2013-0065456 A | 6/2013 |
| KR | 10-2013-0076179 A | 7/2013 |
| KR | 1020130076178 A | 7/2013 |
| KR | 10-2013-0123879 A | 11/2013 |
| KR | 10-1346312 B1 | 12/2013 |
| WO | 99/48598 | 9/1999 |
| WO | 2008/098309 | 8/2008 |
| WO | 2011065418 A1 | 6/2011 |

OTHER PUBLICATIONS

European Patent Office, Communication dated Jan. 10, 2018 by the European Patent Office in counterpart Application No. 15 79 9784.
European Patent Office; Communication dated May 2, 2018 in counterpart application No. 15799784.2.

* cited by examiner

FILTERING SYSTEM AND HOLLOW FIBER MEMBRANE MODULE FOR THE SAME

CROSS REFERENCE TO RELATED APPLICATIONS

This application is a National Stage of International Application No. PCT/KR2015/005374, filed on May 29, 2015, which claims priority from Korean Patent Application Nos 10-2014-0066296, filed on May 30, 2014, and 10-2014-0089714, filed on Jul. 16, 2014, the contents of all of which are incorporated herein by reference in their entirety.

TECHNICAL FIELD

The present invention relates to a filtering system and a hollow fiber membrane module for the same, and more particularly, to an energy-saving filtering system and a hollow fiber membrane module for the same.

BACKGROUND ART

Separation methods for water treatment include a method using heat or phase-change, a method using a filtering membrane, and so on. The method using a filtering membrane has a lot of advantages over the method using heat or phase-change. Among the advantages is the high reliability of water treatment since the water of desired purity can be easily and stably obtained by adjusting the size of the pores of the filtering membrane. Furthermore, since the method using a filtering membrane does not require a heating process, it can be used together with microorganisms which are useful for separation process but vulnerable to heat.

Among the methods using a filtering membrane is a method using a hollow fiber membrane module comprising a bundle of hollow fiber membranes. Typically, a hollow fiber membrane module has been widely used in the field of microfiltration for obtaining axenic water, drinking water, super pure water, and so on. Recently, the application of the hollow fiber membrane module is being extended to wastewater treatment, solid-liquid separation in a septic tank, removal of suspended solid (SS) from industrial wastewater, filtration of river, filtration of industrial water, filtration of swimming pool water, and the like.

The hollow fiber membrane module may be classified into a submerged-type module and a pressurized-type module based on the driving method.

The submerged-type module performs the filtration operation while submerged in a fluid to be treated. Particularly, as the negative pressure is applied to the inside of the hollow fiber membrane, only the fluid exclusive of impurities is allowed to pass through the hollow fiber membrane and enter the inside (lumen) thereof. As a result, the pollutants such as the impurities and sludge contained in the fluid are separated from the filtrate. The submerged-type module is advantageous in that it does not require additional facilities for circulating the fluid, and thus the cost of equipment as well as the operation cost can be reduced. On the other hand, it has a drawback in that the permeate flux obtainable per unit time is limited.

On the contrary, although requiring additional facilities for circulating the fluid, the pressurized-type module pressurizing the fluid from the outside to the inside of the hollow fiber membrane is advantageous in that its permeate flux obtainable per unit time is larger than that of the submerged-type module.

Hereinafter, referring to FIG. 1, a conventional pressurized-type hollow fiber membrane module will be described.

As shown in FIG. 1, a conventional pressurized-type hollow fiber membrane module 10 comprises a case 11 disposed in such a way that its lengthwise direction is perpendicular to a ground G and a hollow fiber membrane (not shown) therein.

The case 11 has the first inlet IL1 for receiving the feed water to be treated, the first outlet OL1 for discharging the filtrate passing through the hollow fiber membrane, the second inlet IL2 for receiving the air for aeration cleaning of the hollow fiber membrane, and the second outlet OL2 for discharging the overflow and/or air out of the case 11.

As shown in FIG. 1, since the first inlet IL1 is formed on the lower part of the case 11 and the first outlet OL1 is formed on the upper part thereof, the conventional pressurized-type hollow fiber membrane module requires a pump P1 as a means for providing a driving force against the gravity (i.e., a means for pressurizing the fluid to be treated).

Consequently, due to such pump P1, there is a limit in reducing the energy consumption of the conventional pressurized-type hollow fiber membrane module 10.

DISCLOSURE

Technical Problem

An aspect of the present invention is to provide an energy-saving filtering system.

Another aspect of the present invention is to provide a hollow fiber membrane module suitable for an energy-saving filtering system and capable of providing the hollow fiber membrane module with air for aeration cleaning uniformly.

Additional aspects and features of the present invention will be set forth in part in the description which follows and in part will become apparent to those having ordinary skill in the art upon examination of the following or may be learned from practice of the invention. The objects and additional advantages of the present invention may be realized and accomplished by such structures as illustrated in the drawings, as explained in the detailed description of the invention, and as specified by the claims.

Technical Solution

In accordance with the aspect of the present invention, there is provided a filtering system comprising: a pretreatment unit for pretreating a feed water, the pretreatment unit including a pretreatment outlet configured to discharge the pretreated feed water; and a hollow fiber membrane module configured to treat the pretreated feed water, wherein, the hollow fiber membrane module comprises: a case disposed in such a way that a lengthwise direction of the case is perpendicular to a ground; and a hollow fiber membrane in the case, the case comprises: a first inlet configured to receive the pretreated feed water; and a first outlet configured to discharge a filtrate produced by the hollow fiber membrane, the first inlet is disposed below the pretreatment outlet so that the pretreated feed water can flow from the pretreatment unit to the case by gravity, and the first outlet is closer to the ground than the first inlet.

In accordance with another aspect of the present invention, there is provided a hollow fiber membrane module comprising: a case including a filtration space, an air space, and a filtrate space between the filtration space and the air space, therein; a hollow fiber membrane disposed in the filtration space to perform a filtration operation, the hollow fiber membrane being in fluid communication with the filtrate space; and at least one tube through which the filtration space and the air space are in fluid communication with each other.

It should be understood that both the aforementioned general description and the following detailed description are just to illustrate or explain the present invention and to provide a more detailed explanation about the claimed subject matters.

Advantageous Effects

According to the present invention, since the gravity is used as a driving force for the filtration operation of the hollow fiber membrane module, an amount of energy which otherwise might be consumed by the pressurizing pump can be saved.

Further, the specific structure of the hollow fiber membrane module of the present invention can prevent the nonuniform aeration cleaning which might occur when the pressurizing filtration is carried out by means of gravity and the relatively rapid contamination of the hollow fiber membrane which might be caused by the nonuniform aeration cleaning.

In addition, when one of the hollow fiber membranes of the pressurized-type hollow fiber membrane module gets damaged, an embodiment of the present invention enables the damaged hollow fiber membrane to be repaired, thereby extending the lifetime of the module without decline of the filtration efficiency.

BRIEF DESCRIPTION OF DRAWINGS

The accompanying drawings, which are included to provide a further understanding of the invention and are incorporated in and constitute a part of this application, illustrate embodiment(s) of the invention and, together with the description, serve to explain the principle of the invention. In the drawings.

MODE FOR INVENTION

The following description just illustrates the principle of the present invention. Although not explicitly explained or illustrated in this specification, a variety of embodiments for realizing the principle of the present invention (i.e., the embodiments within the scope of the present invention) may be invented by a person of ordinary skill in the art. Accordingly, all the embodiments illustrated in this specification are provided only to provide assistance in understanding the present invention, and the present invention is not limited thereto.

When the present invention is explained, detailed description of the related art will be omitted if such description is likely to unnecessarily cloud the essential points of the present invention.

Hereinafter, referring to FIG. 2 to FIG. 10, a variety of embodiments of the filtering system and hollow fiber membrane module of the present invention will be described in detail.

Figure 1:
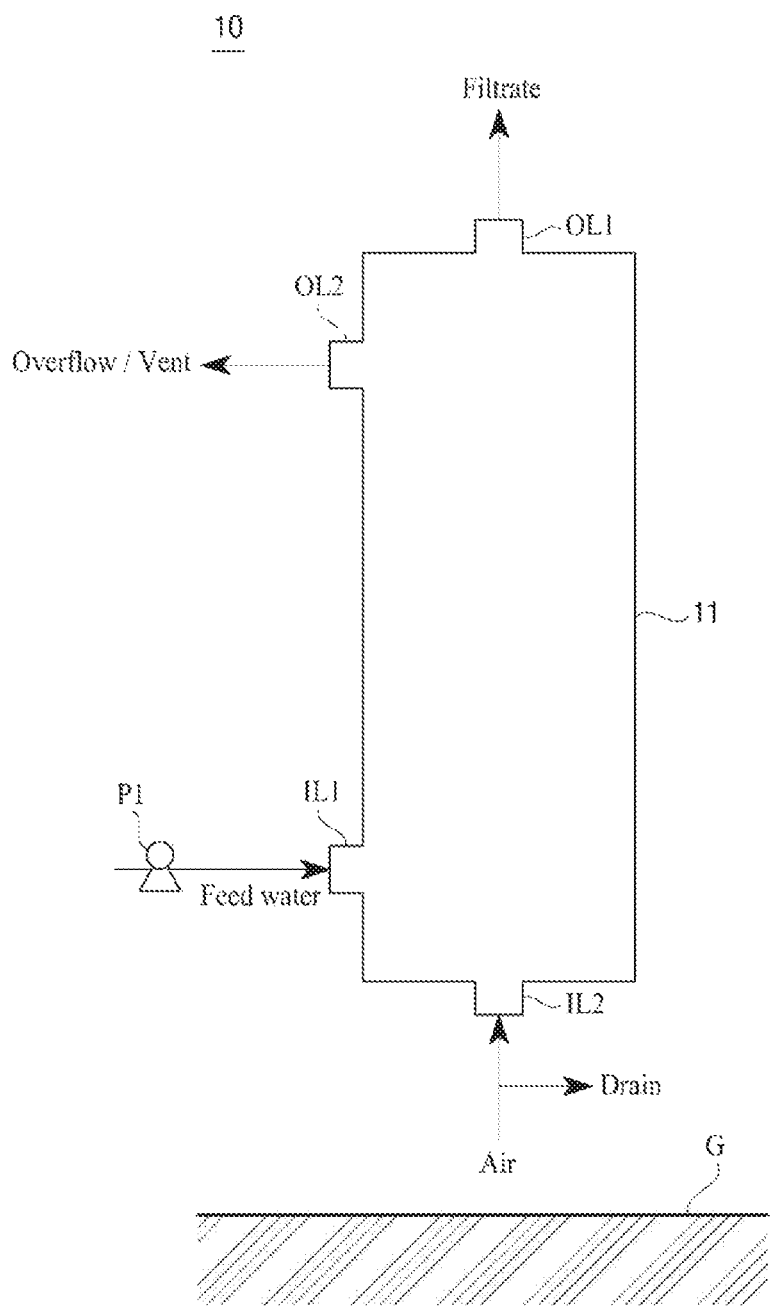
FIG. 1 schematically shows a conventional hollow fiber membrane module.
Figure 2:
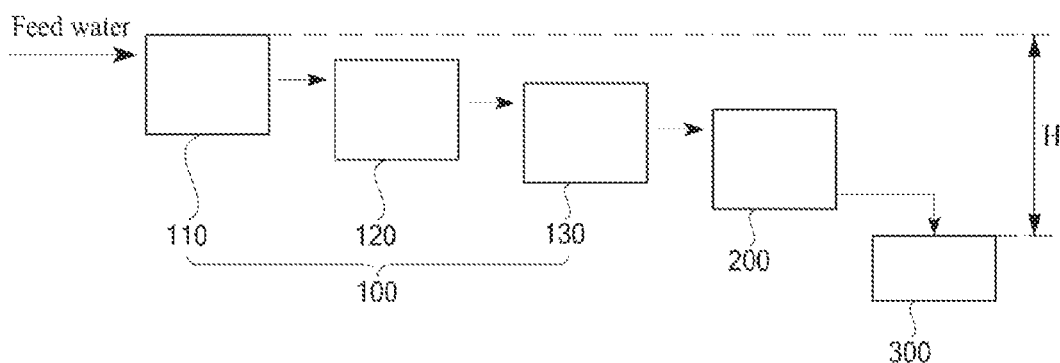
FIG. 2 schematically shows a filtering system according to an embodiment of the present invention.

As illustrated in FIG. 2, the filtering system according to one embodiment of the present invention comprises a pretreatment unit 100 and a hollow fiber membrane module 200.

The pretreatment unit 100 pretreats the feed water by separating out the relatively large or relatively heavy solids from the feed water. The pretreatment unit 100 comprises a gauging well 110, a mixing and coagulation basin 120, and a sedimentation basin 130.

The gauging well 110 receives the feed water to be treated from an intake (not shown), adjusts the amount of the feed water, and stabilize water level thereof.

The mixing and coagulation basin 120 mixes the feed water introduced from the gauging well 110 with a coagulant so that the solids in the feed water can be coagulated (i.e., makes the solids larger and heavier).

In the sedimentation basin 130, the coagulated solids are separated from the relatively pure water (i.e., the pretreated feed water) as they go down by gravity.

The feed water pretreated by the pretreatment unit 100 is further treated by the hollow fiber membrane module 200, and the resulting filtrate is stored in a pure water reservoir 300. The pure water reservoir 300 may be a tank disposed on the ground or buried underground.

According to the present invention, to use the gravity as a driving force for the filtration operation of the hollow fiber membrane module 200 (i.e., to create the head pressure high enough to enable the liquid component to pass through the hollow fiber membrane, thereby obtaining the filtrate), the water level of the gauging well 110 is higher than the pure water reservoir 300 (more specifically, the maximum water level of the pure water reservoir 300) by more than 4.5 m. In addition, according to the present invention, water is prevented from flowing against the gravity between the gauging well 110 and pure water reservoir 300.

Therefore, according to the present invention, the head pressure of about 0.45 kgf/cm$^2$ or more which is naturally created by the gravity can drive the filtration operation of the hollow fiber membrane module 200, and thus a significant amount of energy can be saved.

Hereinafter, referring to FIG. 3, the principle of the present invention regarding how the water can be prevented from flowing against the gravity between the gauging well 110 and pure water reservoir 300 will be explained.

Figure 3:
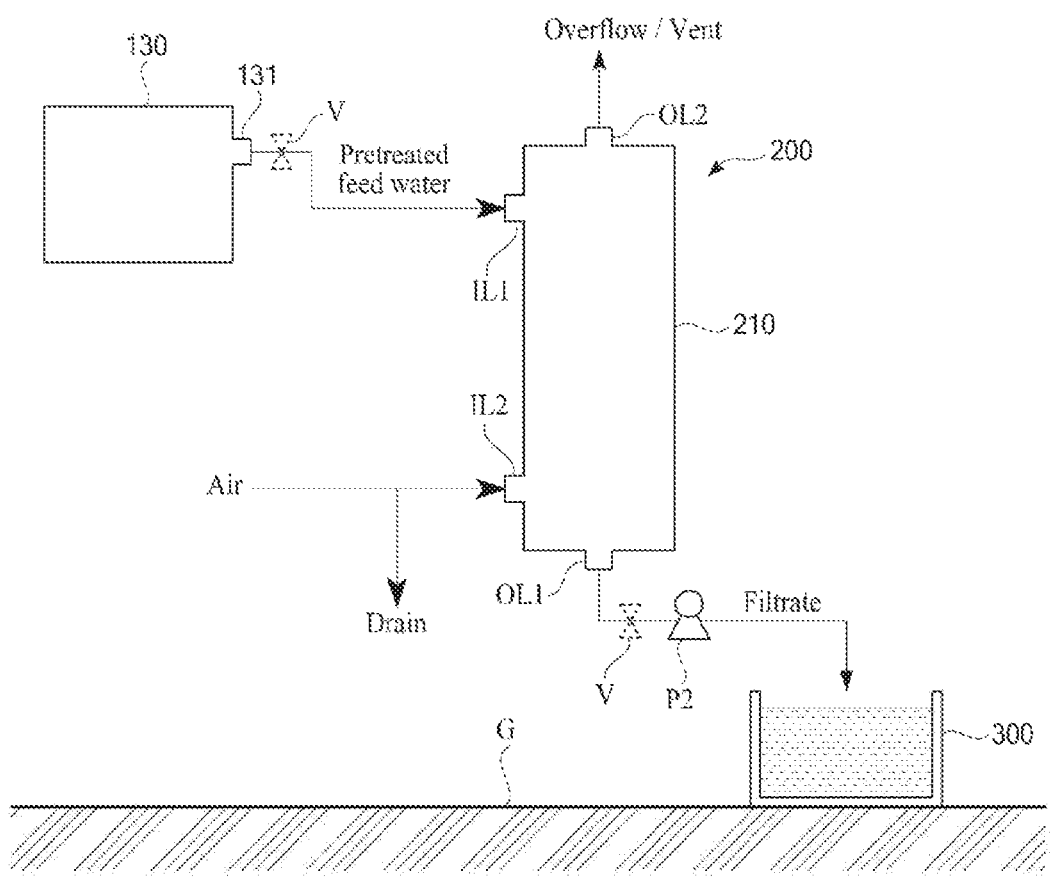
FIG. 3 schematically shows a portion of the filtering system according an embodiment of the present invention.

As illustrated in FIG. 3, the hollow fiber membrane module 200, which further treats the pretreated feed water discharged out of the pretreatment unit 100 through the pretreatment outlet (more specifically, the outlet 131 of the sedimentation basin 130), comprises a case 210 and a hollow fiber membrane (not shown) in the case 210.

The case 210 is disposed in such a way that its lengthwise direction is perpendicular to the ground G. The case 210 comprises a first inlet IL1 configured to receive the pretreated feed water and a first outlet OL1 configured to discharge the filtrate produced by the hollow fiber membrane.

According to the present invention, the first inlet IL1 is disposed below the pretreatment outlet 131 so that the pretreated feed water can flow from the pretreatment unit to the case by gravity, and the first outlet OL1 is closer to the ground G than the first inlet IL1.

As illustrated in FIG. 3, the filtering system of the present invention may further comprise a flow control valve V between the pretreatment outlet 131 and the first inlet IL1 or between the first outlet OL1 and the pure water reservoir 300. When the pure water reservoir 300 is positioned far below the pretreatment outlet 131 (i.e., when the head pressure is sufficiently high), the permeate flux of the hollow fiber may be adjusted by means of the flow control valve V.

The case 210 may further comprise a second outlet OL2 at the upper part thereof. The second outlet OL2 is configured to discharge the overflow and/or air produced during the filtration/backwashing process. The case 210 may further comprise a second inlet IL2 at the lower part thereof. The second inlet IL2 is configured to receive the air for aeration cleaning of the hollow fiber membrane. The second inlet IL2 may also function as a path for draining the feed water remaining in the case 210 when the filtration operation is stopped.

The aeration cleaning of the hollow fiber membrane by means of the air introduced through the second inlet IL2 merely lowers the speed at which the hollow fiber membrane is contaminated, and cannot completely prevent the contamination of the hollow fiber membrane. Therefore, as the filtration is performed, the contamination of the hollow fiber membrane gets severer, and at a certain moment, the head pressure produced by the gravity cannot produce the filtrate any more for itself. In that case, additional pressure needs to be provided to continuously perform the filtration. For this reason, the filtering system of the present invention may further comprise a pump P2 configured to supply a negative pressure to the hollow fiber membrane through the first outlet OL1 of the case 210.

Hereinafter, referring to FIG. 4, the hollow fiber membrane module 200 according to the first embodiment of the present invention will be described in detail.

Figure 4:
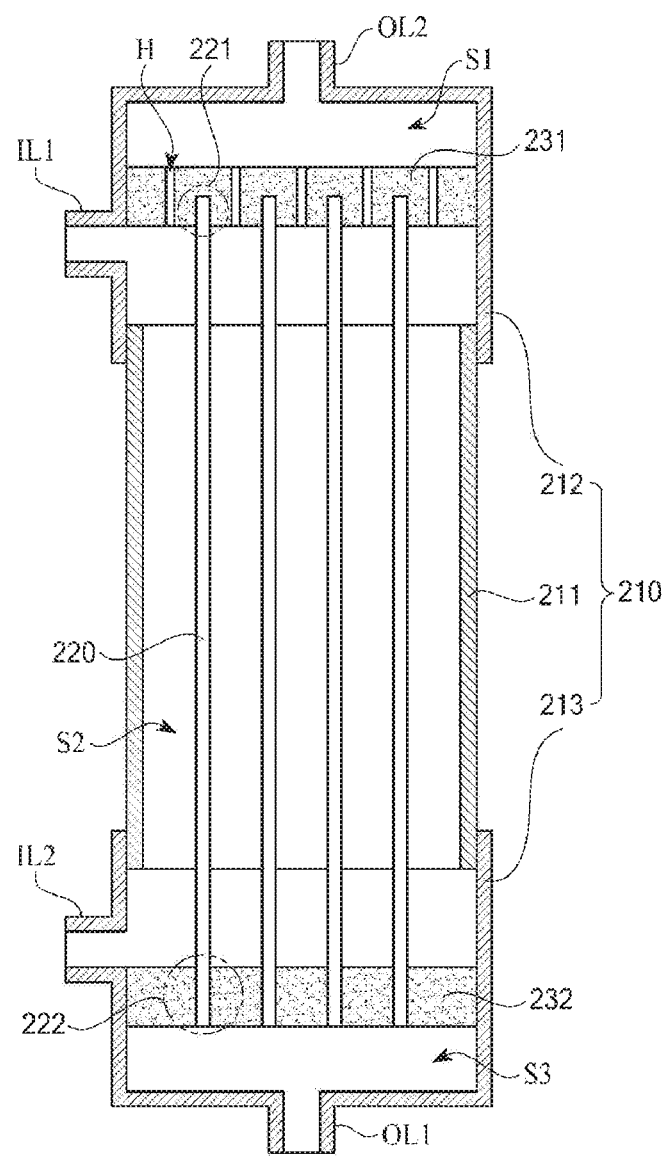
FIG. 4 is a cross section of the hollow fiber membrane module according to the first embodiment of the present invention.

As illustrated in FIG. 4, the hollow fiber membrane module 200 according to the first embodiment of the present invention comprises a case 210, a hollow fiber membrane 220 in the case 210, and first and second fixing members 231 and 232 dividing the inner space of the case 210 into an upper space S1, a filtration space S2, and a lower space S3.

The polymer that can be used for manufacturing the hollow fiber membrane 220 of the present invention comprises at least one of polysulfone, polyethersulfone, sulfonated polysulfone, polyvinylidene fluoride (PVDF), polyacrylonitrile, polyimide, polyamideimide resin, and polyesterimide.

The hollow fiber membrane 220 of the present invention may be a single-layer membrane or a composite membrane. If the hollow fiber membrane 220 is a composite membrane, it may comprise a tubular braid and a polymer thin film coated thereon. The tubular braid may be made of polyester or nylon.

The first and second fixing members 231 and 232, which are water-tightly adhered to the inner surface of the case 210, may be formed of a polymer such as polyurethane resin, silicon resin, epoxy resin, and so on.

Unlike the second fixing member 232, the first fixing member 231 has a plurality of holes H through which the upper space S1 and the filtration space S2 are in fluid communication with each other.

The first and second ends 221 and 222 of the hollow fiber membrane 220 are potted in the first and second fixing members 231 and 232, respectively. Unlike the first end 221, the second end 222 is an open end so that the hollow fiber membrane 220 is in fluid communication with the lower space S3. Hence, the filtrate produced by the hollow fiber membrane 220 can be introduced into the lower space S3.

The case 210 comprises a first inlet IL1 configured to receive the pretreated feed water and a first outlet OL1 configured to discharge the filtrate produced by the hollow fiber membrane 220.

As illustrated in FIG. 4, the first inlet IL1 may be disposed at a part of the case 210 corresponding to the filtration space S2 so that the pretreated feed water can be introduced into the filtration space S2 through the first inlet IL1.

Alternatively, the first inlet IL1 may be disposed at an upper part of the case 210 corresponding to the upper space S1. In this case, the pretreated feed water is introduced into the upper space S1 through the first inlet IL1, and then introduced into the filtration space S2 through the holes H of the first fixing member 231.

As illustrated in FIG. 4, the first outlet OL1 may be disposed at the lower part of the case 210 so that the filtrate produced by the hollow fiber membrane 220 can be discharged out of the lower space S3 through the first outlet OL1.

The case 210 may further comprise a second outlet OL2 configured to discharge the overflow and/or air produced during the filtration/backwashing process and a second inlet IL2 configured to receive the air for aeration cleaning of the hollow fiber membrane 220.

Thus, the liquid or gas existing in the filtration space S2 can be discharged from the hollow fiber membrane module 200 through the second outlet OL2 after entering into the upper space S1 through the holes H of the first fixing member 231.

In addition, the aeration cleaning of the hollow fiber membrane 220 can be carried out by means of the air introduced into the filtration space S2 through the second inlet IL2. The second inlet IL2 may also function as a path for draining the concentrated feed water remaining in the case 210 when the filtration is stopped.

As illustrated in FIG. 4, the case 210 may further comprise a tubular body 211 having an upper open end and a lower open end, an upper cap 212 into which the upper open end is inserted, and a lower cap 213 into which the lower open end is inserted.

The first fixing member 231 is disposed in the upper cap 212 and the first inlet IL1 is formed on the upper cap 212 so that the pretreated feed water can be introduced into the filtration space through the first inlet IL1. The second fixing member 232 is disposed in the lower cap 213 and the first outlet OL1 is formed on the lower cap 213.

Hereinafter, referring to FIG. 5, the hollow fiber membrane module 200 according to the second embodiment of the present invention will be explained.

Since the second embodiment is similar with the first embodiment described above, the difference between the first and second embodiments will be mainly explained.

Figure 5:
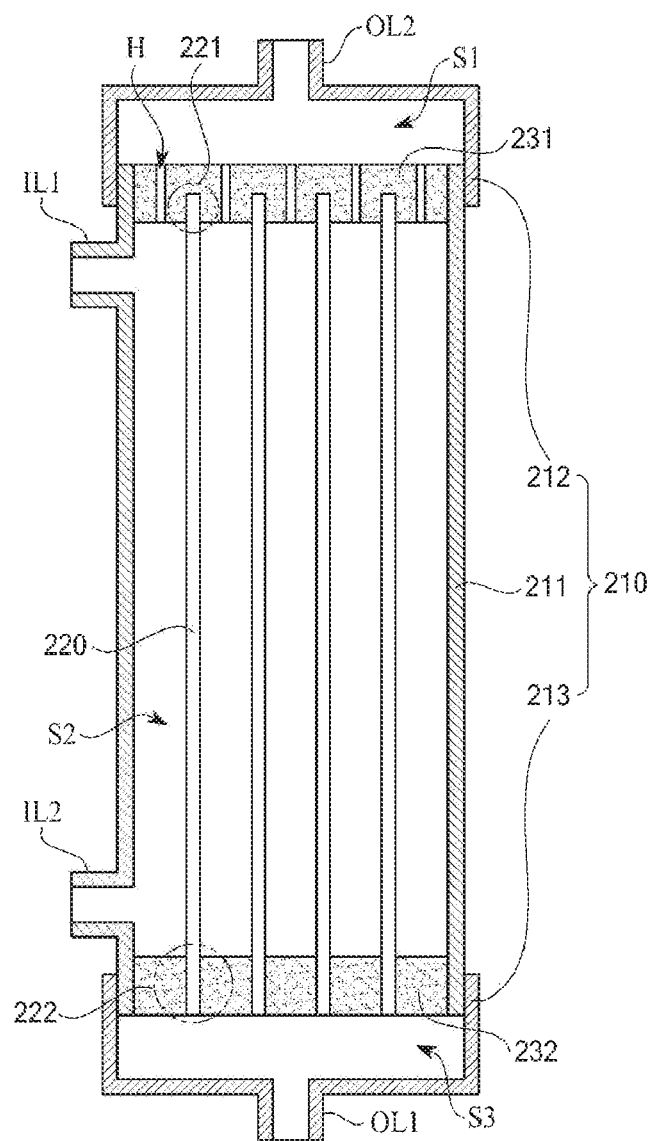
FIG. 5 is a cross section of the hollow fiber membrane module according to the second embodiment of the present invention.

As illustrated in FIG. 5, the second embodiment of the present invention is different from the first embodiment with respect to the positions of the first and second fixing members 231 and 232 within the case 210 and the positions of first and second inlets IL1 and IL2 on the case 210.

That is, according to the second embodiment of the present invention, the first fixing member 231 is disposed in the tubular body 211 at the upper open end, the second fixing member 232 is disposed in the tubular body 211 at the lower open end, the first inlet IL1 is formed on the upper part of the tubular body 211 so that the pretreated feed water can be introduced into the filtration space S2 between the first and second fixing members 231 and 232 through the first inlet IL1, and the second inlet IL2 is formed on the lower part of the tubular body 211 so that the air for aeration cleaning of the hollow fiber membranes 220 can be introduced into the filtration space S2 between the first and second fixing members 231 and 232 through the second inlet IL2.

As described above, the hollow fiber membrane modules 200 according to the first and second embodiments of the present invention have something in common in that the air for aeration cleaning of the hollow fiber membranes 220 is introduced into the filtration space S2 through the second inlet IL2 formed on the lower side of the case 210.

Thus, in the hollow fiber membrane modules 200 of the first and second embodiments of the present invention, the horizontal speed of the air is higher than its vertical speed right after the air is introduced into the filtration space, and thus the amount of the air rising along the hollow fiber membranes 220 adjacent to the side of the case 210 on which the second inlet IL2 is formed is relatively small. In other words, there is a risk of nonuniform aeration cleaning of the hollow fiber membranes 220 which may accelerate the contamination of the hollow fiber membranes 220.

Figure 6:
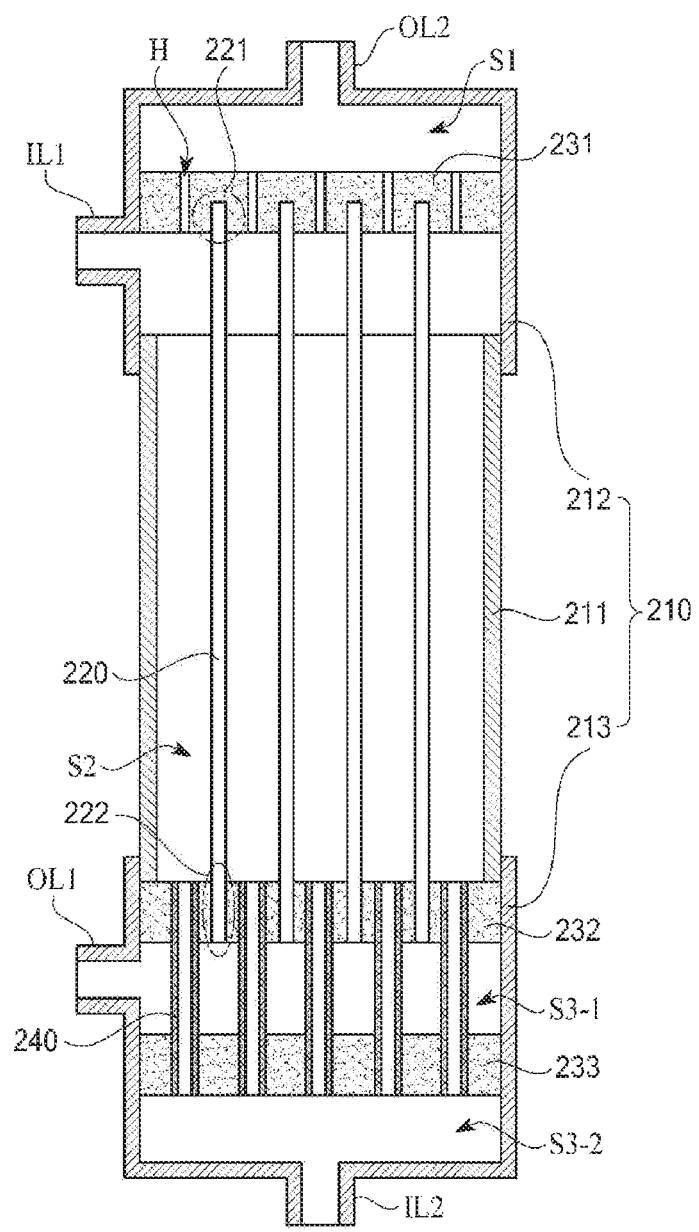
FIG. 6 is a cross section of the hollow fiber membrane module according to the third embodiment of the present invention.
Figure 7:
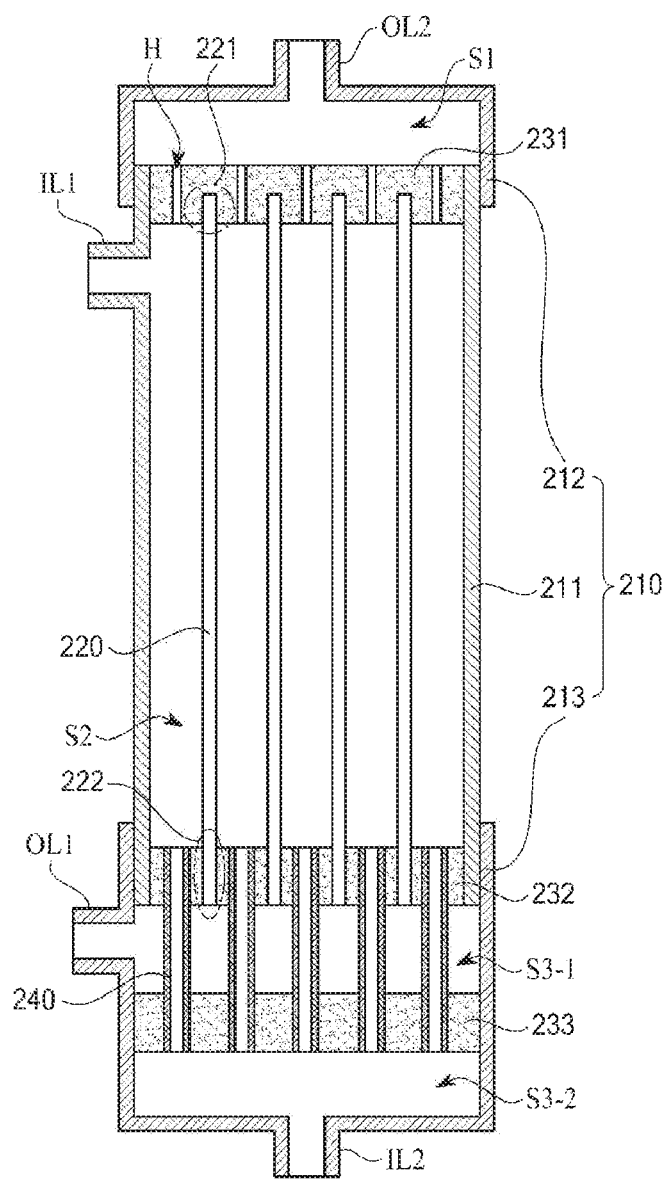
FIG. 7 is a cross section of the hollow fiber membrane module according to the fourth embodiment of the present invention.

As illustrated in FIG. 6 and FIG. 7, the third and fourth embodiments of the present invention, which can solve the aforementioned drawbacks of the first and second embodiments, are different from the first and second embodiments in that:

i) the hollow fiber membrane module 200 further comprises a third fixing member 233 dividing the lower space S3 into a filtrate space S3-1 and an air space S3-2, and at least one tube 240 having two open ends fixed in the second and third fixing members 232 and 233, the filtration space S2 and the air space S3-2 being in fluid communication with each other through the tube 240, ii) the second inlet IL2 of the case 210 for receiving the air for aeration cleaning of the hollow fiber membranes 220 is formed on the central portion of the end part of the case 210 corresponding to the air space S3-2, and iii) the first outlet OL1 of the case 210 for discharging the filtrate produced by the hollow fiber membranes 220 is formed on the side part of the case 210 corresponding to the filtrate space S3-1.

The contamination of the hollow fiber membranes 220 can be delayed as much as possible since the air for aeration cleaning introduced in the air space S3-2 through the second inlet IL2 formed on the central portion of the end part of the case 210 can be uniformly supplied to the filtration space S2 and hollow fiber membranes 220 therein through the uniformly distributed tubes 240.

Hereinafter, referring to FIG. 6, the hollow fiber membrane module 200 according to the third embodiment of the present invention will be explained.

As illustrated in FIG. 6, the hollow fiber membrane module 200 according to the third embodiment of the present invention comprises: a case 210 having first to fourth spaces S1, S2, S3-1, and S3-2 sequentially arranged therein; a first fixing member 231 between the first and second spaces S1 and S2, the first fixing member 231 having a plurality of holes H through which the first and second spaces S1 and S2 are in fluid communication with each other; a second fixing member 232 between the second and third spaces S2 and S3-1; a third fixing member 233 between the third and fourth spaces S3-1 and S3-2; hollow fiber membranes 220 having first and second ends 221 and 222 potted in the first and second fixing members 231 and 232 respectively, the hollow fiber membranes 220 being in fluid communication with the third space S3-1; and at least one tube 240 having two open ends fixed in the second and third fixing members 232 and 233 respectively, the second and fourth spaces S2 and S3-2 being in fluid communication with each other through the tube 240.

The first to fourth spaces S1, S2, S3-1, and S3-2 correspond to the aforementioned upper space, filtration space, filtrate space, and air space, respectively.

The case 210 comprises a first inlet IL1 configured to receive the feed water, a first outlet OL1 configured to discharge the filtrate produced by the hollow fiber membranes 220, and a second inlet IL2 configured to receive the air for aeration cleaning of the hollow fiber membranes 220.

The first inlet IL1 is formed on the side part of the case 210 corresponding to the second space S2, the first outlet OL1 is formed on the side part of the case 210 corresponding to the third space S3-1, and the second inlet IL2 is formed on the central portion of the end part of the case 210 corresponding to the fourth space S3-2.

The case 210 may further comprises a second outlet OL2 on the upper part thereof to discharge the overflow and/or air produced during the filtration/backwashing process. Therefore, the liquid or gas existing in the second space S2 can be discharged from the hollow fiber membrane module 200 through the second outlet OL2 after entering into the first space S1 through the holes H of the first fixing member 231.

The air introduced into the fourth space S3-2 through the second inlet IL2 is uniformly distributed to the second space S2 through the tubes 240 so that the aeration cleaning of the hollow fiber membranes 220 can be performed uniformly.

The second inlet IL2 may also function as a path for draining the concentrated feed water remaining in the case 210 when the filtration is stopped.

As illustrated in FIG. 6, the case 210 may comprise a tubular body 211 having first and second open ends, a first cap 212 (corresponding to the 'upper cap' described above) into which the first open end is inserted, and a second cap 213 (corresponding to the 'lower cap' described above) into which the second open end is inserted.

The first fixing member 231 is disposed in the first cap 212, and the first inlet IL1 is formed on the first cap 212 so that the feed water can be introduced into the second space S2 through the first inlet IL1. Alternatively, the first inlet IL1 may be formed on the tubular body 211.

The second and third fixing members 232 and 233 are disposed in the second cap 213, the second inlet IL2 is formed on the central portion of the second cap 213, and the first outlet OL1 is formed on the side part of the second cap 213 corresponding to the third space S3-1.

Hereinafter, referring to FIG. 7, the hollow fiber membrane module 200 according to the fourth embodiment of the present invention will be explained.

Since the fourth embodiment is similar with the third embodiment described above, the difference between the third and fourth embodiments will be explained.

As illustrated in FIG. 7, the fourth embodiment of the present invention is different from the third embodiment with respect to the positions of the first and second fixing members 231 and 232 within the case 210 and the position of first inlet IL1 on the case 210.

That is, according to the fourth embodiment of the present invention, the first fixing member 231 is disposed in the tubular body 211 at the upper open end, the second fixing member 232 is disposed in the tubular body 211 at the lower open end, and the first inlet IL1 is formed on the tubular body 211 so that the pretreated feed water can be introduced into the second space S2 between the first and second fixing members 231 and 232 through the first inlet IL1.

As described above, according to the third and fourth embodiments of the present invention, the contamination of the hollow fiber membranes 220 can be delayed as much as possible since the air for aeration cleaning introduced in the air space S3-2 through the second inlet IL2 formed on the central portion of the end part of the case 210 (i.e., the second cap (lower cap: 213)) can be uniformly supplied to the filtration space S2 and hollow fiber membranes 220 therein through the tubes 240.

According to the aforementioned first to fourth embodiments of the present invention, both ends of the hollow fiber membranes 220 are respectively potted in the first and second fixing members 231 and 232 which are respectively adhered to the upper and lower inner surfaces of the case 210, and thus it is impossible to expose and repair the hollow fiber membranes 220 without cutting the tubular body 211. Therefore, it is inevitable to discard the entire hollow fiber membrane module 200 even when only one of the plural hollow fiber membranes 220 is damaged.

Hereinafter, referring to FIG. 8, the hollow fiber membrane module 200 according to the fifth embodiment of the present invention will be explained in detail.

Figure 8:
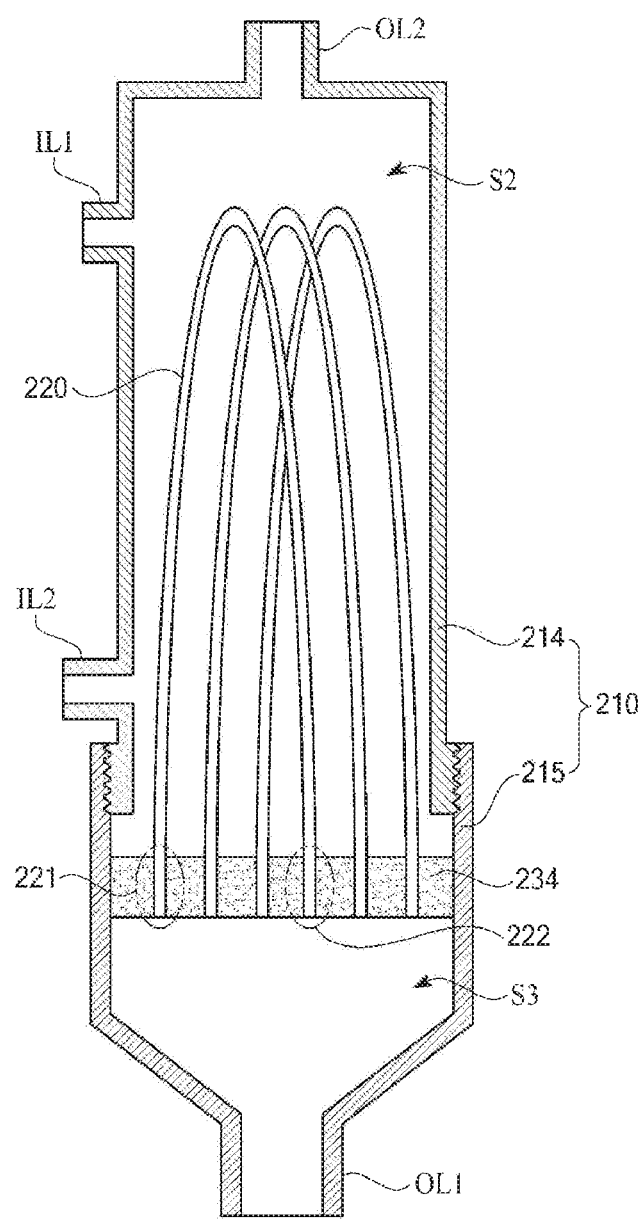
FIG. 8 is a cross section of the hollow fiber membrane module according to the fifth embodiment of the present invention.

As illustrated in FIG. 8, the hollow fiber membrane module 200 according to the fifth embodiment of the present invention comprises a case 210, hollow fiber membranes 220 in the case 210, and a first fixing member 234 dividing the inner space of the case 210 into a filtration space S2 and a lower space S3.

The case 210 comprises a tubular body 214 having a lower open end and a cap 215 detachably coupled to the lower open end of the tubular body 214.

The tubular body 214 comprises a first inlet IL1 configured to receive the pretreated feed water, and the cap 215 comprises a first outlet OL1 configured to discharge the filtrate collected in the lower space S3 after produced by the hollow fiber membranes 220.

In addition, the tubular body 214 further comprises a second inlet IL2 configured to receive the air for aeration cleaning of the hollow fiber membranes 220 and a second outlet OL2 configured to discharge the overflow or air. The second inlet IL2 may also function as a path for draining the concentrated feed water remaining in the case 210 when the filtration is stopped.

The first cap 234 dividing the inner space of the case 210 into the filtration space S2 and the lower space S3 is disposed inside the cap 215. The first fixing member 234 which may be formed of a polymer such as polyurethane resin, silicon resin, epoxy resin, and so on is water-tightly adhered to the inner surface of the cap 215.

The both ends 221 and 222 of the hollow fiber membrane 220 are potted in the first fixing member 234, and the hollow fiber membrane 220 is in fluid communication with the lower space S3 through the both ends 221 and 222 which are open ends. Thus, the filtrate produced by the hollow fiber membrane 220 can be introduced into the lower space S3.

The polymer that can be used for manufacturing the hollow fiber membrane 220 of the present invention comprises at least one of polysulfone, polyethersulfone, sulfonated polysulfone, polyvinylidene fluoride (PVDF), polyacrylonitrile, polyimide, polyamideimide resin, and polyesterimide.

The hollow fiber membrane 220 of the present invention may be a single-layer membrane or a composite membrane. If the hollow fiber membrane 220 is a composite membrane, it may comprise a tubular braid and a polymer thin film coated thereon. The tubular braid may be made of polyester or nylon.

Hereinafter, the filtration method of the hollow fiber membrane module 200 illustrated in FIG. 8 will be explained.

First, the pretreated feed water is introduced into the filtration space S2 in the case 210 through the first inlet IL1. As the pretreated feed water is continuously introduced into the case 210 by gravity, the air having existed in the filtration space S2 is discharged from the hollow fiber membrane module 200 through the second outlet OL2. After the filtration space S2 is filled with the pretreated feed water, the overflow is discharged from the hollow fiber membrane module 200 through the second outlet OL2 and the filtration by pressurization is performed (i.e., filtrate passing through the hollow fiber membranes 220 is produced).

When the filtration under pressurization is carried out, the air is introduced into the filtration space S2 through the second inlet IL2, used for aeration cleaning of the hollow fiber membranes 220, and then discharged from the hollow fiber membrane module 200 through the second outlet OL2.

The filtrate produced by the hollow fiber membrane 220 is introduced into the lower space S3 of the case 210 through the both ends 221 and 222 of the hollow fiber membrane 220, and then discharged from the hollow fiber membrane module 200 through the first outlet OL1.

According to the aforementioned hollow fiber membrane module 200 of the fifth embodiment of the present invention, since both ends 221 and 222 of the hollow fiber membrane 220 are potted in the first fixing member 234 which is water-tightly adhered to the inner surface of the cap 215, the entire part of the hollow fiber membrane 220 except the both ends 221 and 222 can be exposed by separating the tubular body 214 from the cap 215.

Therefore, according to the fifth embodiment of the present invention, when the filtrate permeation part of the hollow fiber membrane 220 is damaged, the damaged part of the hollow fiber membrane 220 can be repaired (for example, by patching or soldering) after the tubular body 214 and cap 215 are separated from each other, thereby extending the lifetime of the hollow fiber membrane module 200 without degradation of the filtration efficiency.

Hereinafter, referring to FIG. 9, the hollow fiber membrane module 200 according to the sixth embodiment of the present invention will be explained.

Since the sixth embodiment of the present invention is similar to the fifth embodiment described above, the difference between the fifth and sixth embodiments will be explained mainly.

Figure 9:
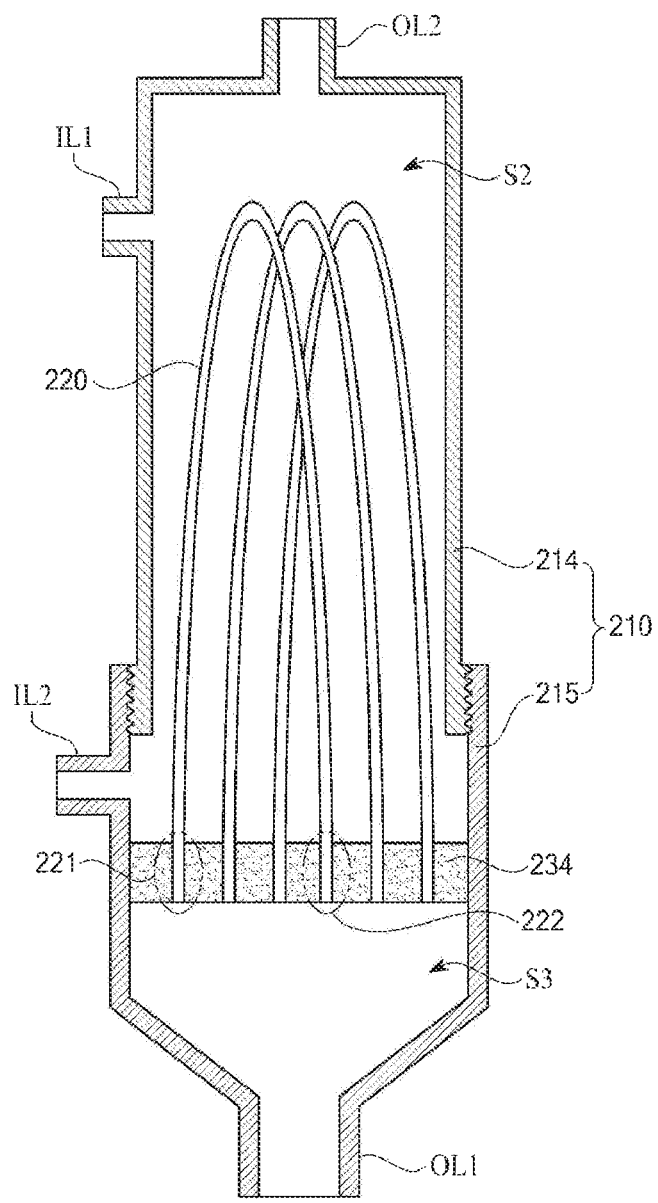
FIG. 9 is a cross section of the hollow fiber membrane module according to the sixth embodiment of the present invention.

As illustrated in FIG. 9, the sixth embodiment of the present invention is different from the fifth embodiment with respect to the position of the second inlet IL2. That is, the sixth embodiment of the present invention is different from the fifth embodiment in that the second inlet IL2 is formed on the upper part of the cap 215 rather than on the lower part of the tubular body 214. However, they are identical with each other in that the air for aeration cleaning of the hollow fiber membrane 220 is introduced into the filtration space S2 through the second inlet IL2.

The hollow fiber membrane modules 200 according to the fifth and sixth embodiments of the present invention as described above shares the feature that the air for aeration cleaning of the hollow fiber membrane 220 is introduced into the filtration space S2 through the second inlet IL2 formed on the lower side of the case 210.

Therefore, in the hollow fiber membrane modules 200 according to the fifth and sixth embodiments of the present invention, the horizontal speed of the air is higher than the vertical speed right after it is introduced into the filtration space, and thus the amount of the air rising along the hollow fiber membranes 220 adjacent to the side of the case 210 on which the second inlet IL2 is formed is relatively small. In other words, there is a risk of nonuniform aeration cleaning of the hollow fiber membranes 220 which may accelerate the contamination of the hollow fiber membranes 220.

Figure 10:
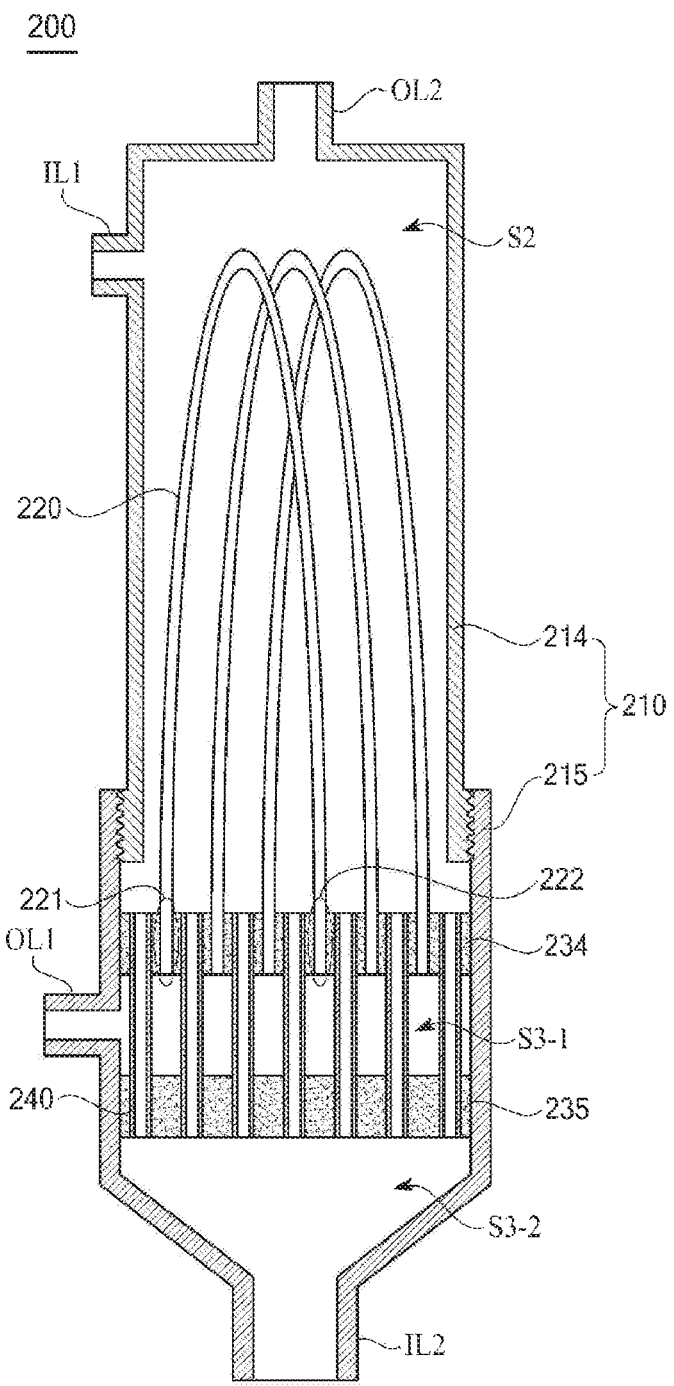
FIG. 10 is a cross section of the hollow fiber membrane module according to the seventh embodiment of the present invention.

As illustrated in FIG. 10, the seventh embodiment of the present invention, which can solve the aforementioned drawbacks of the fifth and sixth embodiments, is different from the fifth and sixth embodiments in that:

i) the hollow fiber membrane module 200 further comprises a second fixing member 235 dividing the lower space S3 into a filtrate space S3-1 and an air space S3-2, and at least one tube 240 having two open ends potted in the first and second fixing members 234 and 235, the filtration space S2 and the air space S3-2 being in fluid communication with each other through the tube 240, ii) the second inlet IL2 for receiving the air for aeration cleaning of the hollow fiber membranes 220 is formed on the central portion of the end part of the cap 215 corresponding to the air space S3-2, and iii) the first outlet OL1 for discharging the filtrate produced by the hollow fiber membranes 220 is formed on the side part of the cap 215 corresponding to the filtrate space S3-1.

The air for aeration cleaning introduced into the air space S3-2 through the second inlet IL2 formed on the central portion of the end part of the cap 215 can be uniformly supplied to the filtration space S2 and hollow fiber membranes 220 therein through the uniformly distributed tubes 240, and thus the contamination of the hollow fiber membranes 220 can be delayed as much as possible During the filtration process, the air for aeration cleaning received by the second inlet IL2 passes through the air space S3-2 and tubes 240 sequentially, and then enters the filtration space S2. On the other hand, once the filtration is stopped, the second inlet IL2 may function as a path for draining the concentrated feed water remaining in the case 210.

The invention claimed is:

1. A filtering system comprising:
a pretreatment unit for pretreating a feed water, the pretreatment unit including a pretreatment outlet configured to discharge the pretreated feed water; and
a hollow fiber membrane module configured to treat the pretreated feed water,
wherein,
the hollow fiber membrane module comprises:
a case disposed in such a way that a lengthwise direction of the case is perpendicular to a ground; and
a hollow fiber membrane in the case,
the case comprises:
a first inlet configured to receive the pretreated feed water; and
a first outlet configured to discharge a filtrate produced by the hollow fiber membrane,
the first inlet is disposed below the pretreatment outlet so that the pretreated feed water can flow from the pretreatment unit to the case by gravity,
the first outlet is closer to the ground than the first inlet,
the hollow fiber membrane module further comprises first and second fixing members dividing an inner space of the case into an upper space, a filtration space, and a lower space,
the first fixing member has a plurality of holes through which the upper space and the filtration space are in fluid communication with each other,
first and second ends of the hollow fiber membrane are potted in the first and second fixing members, respectively,
the second end potted in the second fixing member is an open end so that the hollow fiber membrane can be fluid communication with the lower space and the filtrate produced by the hollow fiber membrane can be introduced into the lower space, and
the first outlet is disposed at a lower part of the case so that the filtrate can be discharged from the lower space through the first outlet.

2. The filtering system of claim 1, wherein the pretreatment unit comprises:
a gauging well configured to adjust an amount of the feed water to be pretreated and stabilize water level thereof;
a mixing and coagulation basin configured to mix the feed water introduced from the gauging well with a coagulant so that solids in the feed water can be coagulated; and
a sedimentation basin in which the coagulated solids are separated from the pretreated feed water as the coagulated solids go down by gravity.

3. The filtering system of claim 1, wherein the first inlet is disposed at a part of the case corresponding to the filtration space so that the pretreated feed water can be introduced into the filtration space through the first inlet.

4. The filtering system of claim 1, wherein the first inlet is disposed at an upper part of the case so that the pretreated feed water can be introduced into the upper space through the first inlet.

5. The filtering system of claim 1, wherein the case further comprises:
a tubular body having an upper open end and a lower open end;
an upper cap into which the upper open end is inserted; and
a lower cap into which the lower open end is inserted.

6. The filtering system of claim 5, wherein the first fixing member is disposed in the upper cap,
the first inlet is formed on the upper cap so that the pretreated feed water can be introduced into the filtration space through the first inlet,
the second fixing member is disposed in the lower cap, and
the first outlet is formed on the lower cap.

7. The filtering system of claim 6, wherein the first fixing member is disposed in the tubular body at the upper open end,
the second fixing member is disposed in the tubular body at the lower open end,
the first inlet is formed on the tubular body so that the pretreated feed water can be introduced into the filtration space through the first inlet, and
the first outlet is formed on the lower cap.

8. The filtering system of claim 1, wherein the hollow fiber membrane module further comprises:
- a third fixing member dividing the lower space into a filtrate space and an air space; and
- at least one tube having two open ends fixed in the second and third fixing members, the filtration space and the air space being in fluid communication with each other through the tube,
- the case further comprises a second inlet configured to receive an air for aeration cleaning of the hollow fiber membrane, the second inlet formed on a central portion of an end part of the case, the end part corresponding to the air space, and
- the first outlet is formed on a side part of the case corresponding to the filtrate space.

9. The filtering system of claim 8, wherein the case further comprises:
- a tubular body having an upper open end and a lower open end;
- an upper cap into which the upper open end is inserted; and
- a lower cap into which the lower open end is inserted,
- the first fixing member is disposed in the upper cap,
- the first inlet is formed on the upper cap so that the pretreated feed water can be introduced into the filtration space through the first inlet,
- the second and third fixing members are disposed in the lower cap,
- the second inlet is formed on a central portion of the lower cap, and
- the first outlet is formed on a side part of the lower cap corresponding to the filtrate space.

10. The filtering system of claim 8, wherein the case further comprises:
- a tubular body having an upper open end and a lower open end;
- an upper cap into which the upper open end is inserted; and
- a lower cap into which the lower open end is inserted,
- the first fixing member is disposed in the tubular body at the upper open end,
- the second fixing member is disposed in the tubular body at the lower open end,
- the first inlet is formed on the tubular body so that the pretreated feed water can be introduced into the filtration space through the first inlet,
- the third fixing member is disposed in the lower cap,
- the second inlet is formed on a central portion of the lower cap, and
- the first outlet is formed on a side part of the lower cap corresponding to the filtrate space.

11. The filtering system of claim 1, further comprising a pump configured to supply a negative pressure to the hollow fiber membrane through the first outlet.

12. A filtering system comprising:
- a pretreatment unit for pretreating a feed water, the pretreatment unit including a pretreatment outlet configured to discharge the pretreated feed water; and
- a hollow fiber membrane module configured to treat the pretreated feed water, wherein,
the hollow fiber membrane module comprises:
a case disposed in such a way that a lengthwise direction of the case is perpendicular to a ground; and
a hollow fiber membrane in the case,
the case comprises:
- a first inlet configured to receive the pretreated feed water; and
- a first outlet configured to discharge a filtrate produced by the hollow fiber membrane,
- the first inlet is disposed below the pretreatment outlet so that the pretreated feed water can flow from the pretreatment unit to the case by gravity,
- the first outlet is closer to the ground than the first inlet,
- the case comprises a tubular body having a lower open end and a cap detachably coupled to the lower open end of the tubular body,
- the hollow fiber membrane module further comprises a first fixing member disposed in the cap, the first fixing member dividing an inner space of the case into a filtration space and a lower space, and
- both ends of the hollow fiber membrane are potted in the first fixing member so that the hollow fiber membrane can be in fluid communication with the lower space.

13. The filtering system of claim 12, wherein the hollow fiber membrane module further comprises:
- a second fixing member disposed in the cap, the second fixing member dividing the lower space into a filtrate space and an air space; and
- at least one tube having two open ends potted in the first and second fixing members, the filtration space and the air space being in fluid communication with each other through the tube, and
- the hollow fiber membrane is in fluid communication with the filtrate space.

14. A hollow fiber membrane module comprising:
- a case including a filtration space, an air space, and a filtrate space between the filtration space and the air space, therein;
- a hollow fiber membrane disposed in the filtration space to perform a filtration operation, the hollow fiber membrane being in fluid communication with the filtrate space; and
- at least one tube through which the filtration space and the air space are in fluid communication with each other.

15. The hollow fiber membrane module of claim 14, wherein the case is provided with a first inlet through which a feed water to be treated is supplied to the filtration space and a first outlet through which a filtrate produced by the hollow fiber membrane and collected in the filtrate space is discharged out of the case.

16. The hollow fiber membrane module of claim 15, further comprising a fixing member between the filtration space and the filtrate space,
- wherein the hollow fiber membrane has first and second ends, and
- at least one of the first and second ends is potted in the fixing member so that the hollow fiber membrane can be in fluid communication with the filtrate space.

17. The hollow fiber membrane module of claim 16, wherein only one of the first and second ends is potted in the fixing member.

18. The hollow fiber membrane module of claim 16, wherein both the first and second ends are potted in the fixing member.

* * * * *